United States Patent [19]
Voelzke

[11] Patent Number: 5,879,122
[45] Date of Patent: Mar. 9, 1999

[54] CONTAINER MOVING VEHICLE

[76] Inventor: Harry Voelzke, 813 W 4th, Mitchell, S. Dak. 57301

[21] Appl. No.: 846,668

[22] Filed: Apr. 29, 1997

[51] Int. Cl.$^6$ ........................................................ B60P 1/02
[52] U.S. Cl. ............................ 414/458; 254/10 R; 254/49; 414/495; 414/498; 414/917
[58] Field of Search ..................... 414/458, 495, 414/498, 917; 254/10 R, 10 B, 10 C, 45, 49

[56] References Cited

U.S. PATENT DOCUMENTS

| | | | |
|---|---|---|---|
| 2,672,247 | 3/1954 | Jewett | 414/498 X |
| 2,897,989 | 8/1959 | Houdsell | 414/458 |
| 2,926,804 | 3/1960 | Fuhrmann et al. | 414/458 |
| 2,934,228 | 4/1960 | Hillberg | 414/458 |
| 3,018,905 | 1/1962 | Thornton-Trump | 414/458 |
| 3,147,999 | 9/1964 | Daniels | 298/15 |
| 3,424,489 | 1/1969 | Hoy | 414/495 X |
| 3,468,440 | 9/1969 | Poole | 414/458 |
| 3,471,045 | 10/1969 | Panciocco | 414/522 |
| 3,517,843 | 6/1970 | John | 414/458 X |
| 3,520,429 | 7/1970 | Andersson | 414/458 X |
| 3,630,571 | 12/1971 | Saldana | 298/14 |
| 3,826,534 | 7/1974 | Ruff | 298/1 A |
| 3,836,027 | 9/1974 | Gardner | 254/10 R X |
| 4,050,672 | 9/1977 | Lane | 414/455 X |
| 4,084,851 | 4/1978 | Duncan, Sr. | 298/14 |
| 4,126,357 | 11/1978 | Day | 298/1 A |
| 4,139,236 | 2/1979 | Hill et al. | 298/14 |
| 4,647,110 | 3/1987 | McKee | 298/1 A |

FOREIGN PATENT DOCUMENTS

| | | | |
|---|---|---|---|
| 1239300 | 7/1960 | France | 414/458 |
| 1453288 | 9/1966 | France | 414/458 |
| 3138824 | 4/1983 | Germany | 414/495 |
| 630032 | 5/1982 | Switzerland | 414/495 |

*Primary Examiner*—David A. Bucci

[57] ABSTRACT

A new container moving vehicle for lifting and moving dumpsters and other similar types of rubbish containers. The inventive device includes a front vehicle portion which is similar to conventional pick-up truck type of vehicles, including a drivers cab, an engine for powering the vehicle, and front wheels. A U-shaped frame is rigidly attached to the rear of the front portion and extends rearwardly therefrom. The frame includes a base end which is secured to the rear of the front portion, and a pair of spaced arms extending from the base end. Each of the arms includes its own wheel assembly for supporting the arms upon the ground, and there is no connection between the wheel assemblies or the arms, such that the U-shape is substantially unobstructed. A U-shaped lift apparatus, having a base end and a pair of spaced arms which are parallel to the arms of the frame, is mounted on the U-shaped frame and is raised or lowered in a vertical direction relative thereto for raising and lowering the container. Hydraulic actuators are provided for raising and lowering the lift apparatus. Additional hydraulic actuators are provided for selectively engaging the lift apparatus with the container.

20 Claims, 3 Drawing Sheets

CONTAINER MOVING VEHICLE

BACKGROUND OF THE INVENTION

1. Field of the Invention

The present invention relates to container transport vehicles and more particularly pertains to a new container moving vehicle for lifting and moving dumpsters and other similar types of rubbish containers.

2. Description of the Prior Art

The use of container transport vehicles is known in the prior art. More specifically, container transport vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art container transport vehicles include U.S. Pat. No. 4,084,851; U.S. Pat. No. 3,826,534; U.S. Pat. No. 3,630,571; U.S. Pat. No. 4,126,357; U.S. Pat. No. 4,139,236; U.S. Pat. No. 3,471,045; U.S. Pat. No. 3,147,999; and U.S. Pat. No. 4,647,110. While all these prior art vehicles transport rubbish containers or the like, they all require that the container be supported upon a raised platform or support structure at the rear end of the vehicle. Thus a mechanism must be provided so as to push/pull, and lift, the container onto and off of the platform or other support structure. Since the mechanism must perform both a push/pull and lift function, the mechanism is complicated to operate, and adds weight and expense to the vehicle. A vehicle which eliminates one of the above functions would therefore be desirable, so as to allow a reduction in the expense and weight of the vehicle, and making the vehicle less complicated to operate.

While these devices fulfill their respective, particular objectives and requirements, the aforementioned patents do not disclose a new container moving vehicle. The inventive device includes a front vehicle portion which is similar to conventional pick-up truck type of vehicles, including a drivers cab, an engine for powering the vehicle, and front wheels. A U-shaped frame is rigidly attached to the rear of the front portion and extends rearwardly therefrom. The frame includes a base end which is secured to the rear of the front portion, and a pair of spaced arms extending from the base end. Each of the arms includes its own wheel assembly for supporting the arms upon the ground, and there is no connection between the wheel assemblies or the arms, such that the U-shape is substantially unobstructed. A U-shaped lift apparatus, having a base end and a pair of spaced arms which are parallel to the arms of the frame, is mounted on the U-shaped frame and is raised or lowered in a vertical direction relative thereto for raising and lowering the container. Hydraulic actuators are provided for raising and lowering the lift apparatus. Additional hydraulic actuators are provided for selectively engaging the lift apparatus with the container.

In these respects, the container moving vehicle according to the present invention substantially departs from the conventional concepts and designs of the prior art, and in so doing provides an apparatus primarily developed for the purpose of lifting and moving dumpsters and other similar types of rubbish containers.

SUMMARY OF THE INVENTION

In view of the foregoing disadvantages inherent in the known types of container transport vehicles now present in the prior art, the present invention provides a new container moving vehicle construction wherein the same can be utilized for lifting and moving dumpsters and other similar types of rubbish containers.

The general purpose of the present invention, which will be described subsequently in greater detail, is to provide a new container moving vehicle apparatus which has many of the advantages of the container transport vehicles mentioned heretofore and many novel features that result in a new container moving vehicle which is not anticipated, rendered obvious, suggested, or even implied by any of the prior art container transport vehicles, either alone or in any combination thereof.

To attain this, the present invention generally comprises a front vehicle portion which is similar to conventional pick-up truck type of vehicles, including a drivers cab, an engine for powering the vehicle, and front wheels. A U-shaped frame is rigidly attached to the rear of the front portion and extends rearwardly therefrom. The frame includes a base end which is secured to the rear of the front portion, and a pair of spaced arms extending from the base end. Each of the arms includes its own wheel assembly for supporting the arms upon the ground, and there is no connection between the wheel assemblies or the arms, such that the U-shape is substantially unobstructed. A U-shaped lift apparatus, having a base end and a pair of spaced arms which are parallel to the arms of the frame, is mounted on the U-shaped frame and is raised or lowered in a vertical direction relative thereto for raising and lowering the container. Hydraulic actuators are provided for raising and lowering the lift apparatus. Additional hydraulic actuators are provided for selectively engaging the lift apparatus with the container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new container moving vehicle apparatus which has many of the advantages of the container transport vehicles mentioned heretofore and many novel features that result in a new container moving vehicle which is not anticipated, rendered obvious, suggested, or even implied by any of the prior art container transport vehicles, either alone or in any combination thereof.

It is another object of the present invention to provide a new container moving vehicle which may be easily and efficiently manufactured and marketed.

It is a further object of the present invention to provide a new container moving vehicle which is of a durable and reliable construction.

An even further object of the present invention is to provide a new container moving vehicle which is susceptible of a low cost of manufacture with regard to both materials and labor, and which accordingly is then susceptible of low prices of sale to the consuming public, thereby making such container moving vehicle economically available to the buying public.

Still yet another object of the present invention is to provide a new container moving vehicle which provides in the apparatuses and methods of the prior art some of the advantages thereof, while simultaneously overcoming some of the disadvantages normally associated therewith.

Still another object of the present invention is to provide a new container moving vehicle for lifting and moving dumpsters and other similar types of rubbish containers.

Yet another object of the present invention is to provide a new container moving vehicle which includes a front vehicle portion which is similar to conventional pick-up truck type of vehicles, including a drivers cab, an engine for powering the vehicle, and front wheels. A U-shaped frame is rigidly attached to the rear of the front portion and extends rearwardly therefrom. The frame includes a base end which is secured to the rear of the front portion, and a pair of spaced arms extending from the base end. Each of the arms includes its own wheel assembly for supporting the arms upon the ground, and there is no connection between the wheel assemblies or the arms, such that the U-shape is substantially unobstructed. A U-shaped lift apparatus, having a base end and a pair of spaced arms which are parallel to the arms of the frame, is mounted on the U-shaped frame and is raised or lowered in a vertical direction relative thereto for raising and lowering the container. Hydraulic actuators are provided for raising and lowering the lift apparatus. Additional hydraulic actuators are provided for selectively engaging the lift apparatus with the container.

Still yet another object of the present invention is to provide a new container moving vehicle that can be backed up to a position surrounding the container, thus eliminating the need to either push or pull the container relative to the vehicle when moving the container.

Even still another object of the present invention is to provide a new container moving vehicle that transports containers cheaply and quickly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
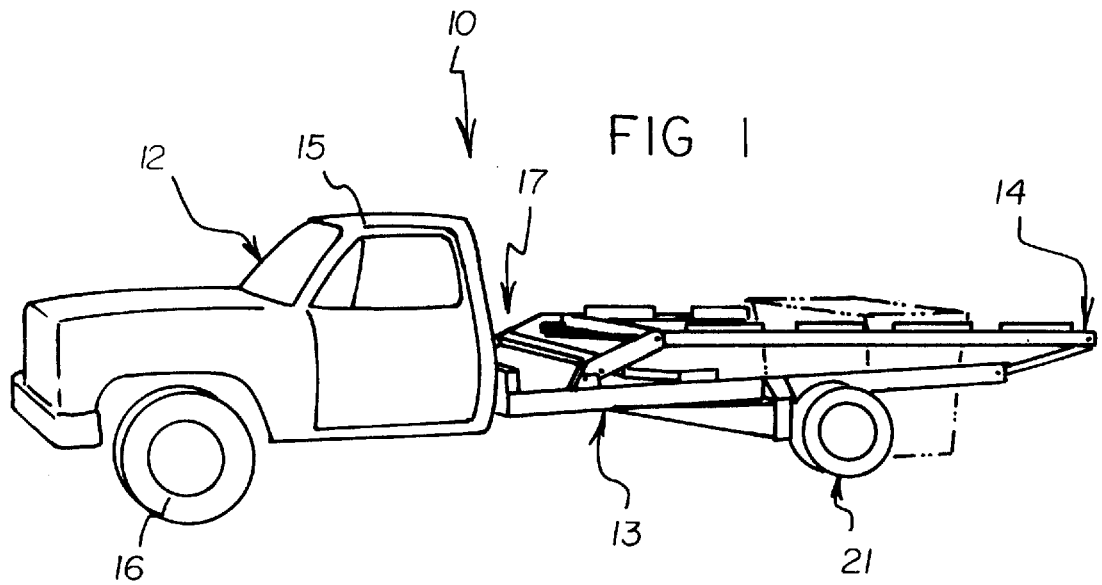
FIG. 1 is a front, left-side perspective view of a new container moving vehicle according to the present invention, with the lift apparatus lowered.

With reference now to the drawings, and in particular to FIGS. 1 through 6 thereof, a new container moving vehicle embodying the principles and concepts of the present invention and generally designated by the reference numeral 10 will be described.

As best illustrated in FIGS. 1 through 6, the container moving vehicle 10 comprises a front vehicle portion 12, a U-shaped frame 13 extending from the rear of the portion 12, and a U-shaped lift apparatus 14 mounted on the U-shaped frame 13.

The front vehicle portion 12 is similar to the front end of a conventional pick-up truck type of vehicle, and includes a cab portion 15 for the driver of the vehicle, an engine (not shown) mounted in front of the cab portion for powering the vehicle, and a pair of front wheels 16 for supporting the front end of the vehicle 10. The front portion 12 is otherwise conventional in structure.

Figure 3:
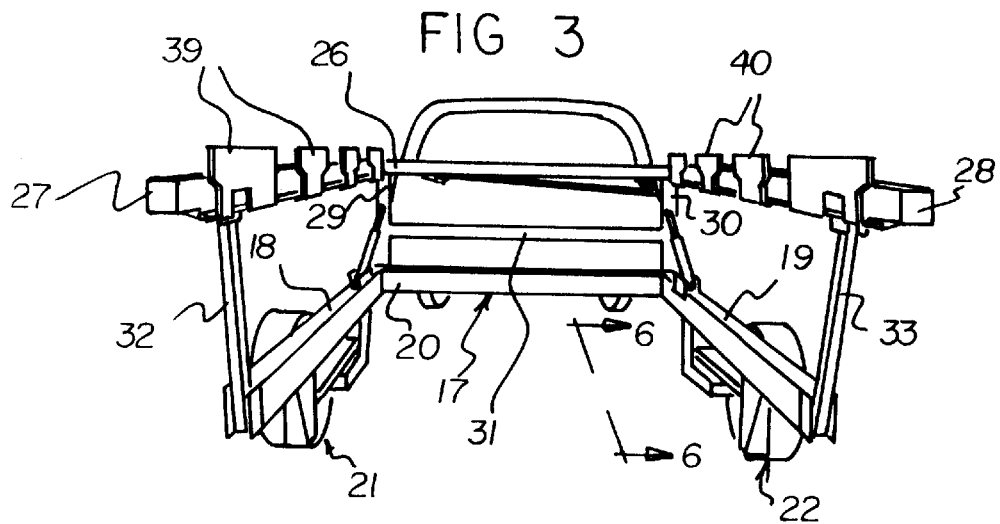
FIG. 3 is a rear view of the vehicle.
Figure 4:
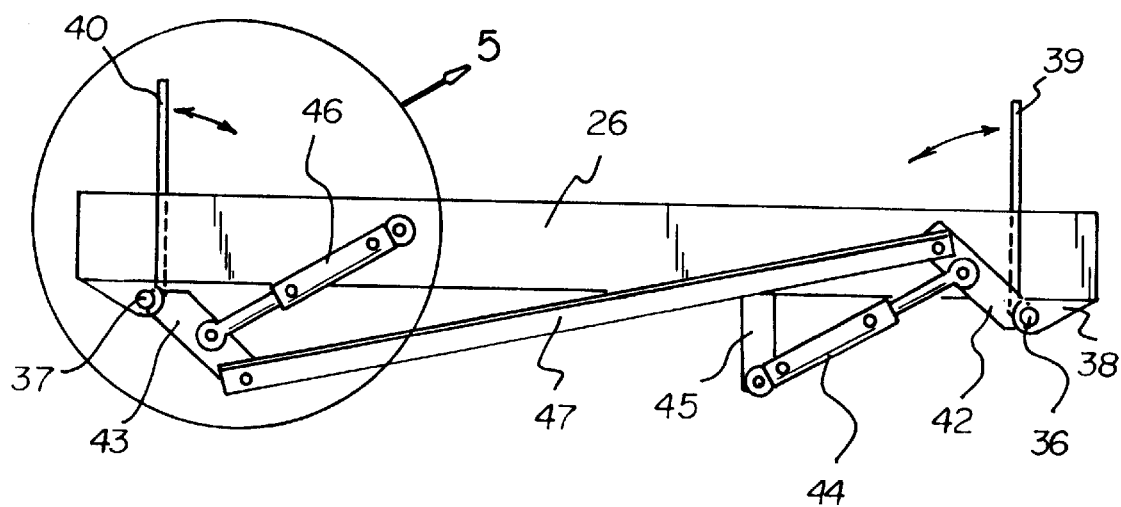
FIG. 4 is a view looking towards the rear of the vehicle showing the actuation mechanism for the lifting plates.
Figure 5:
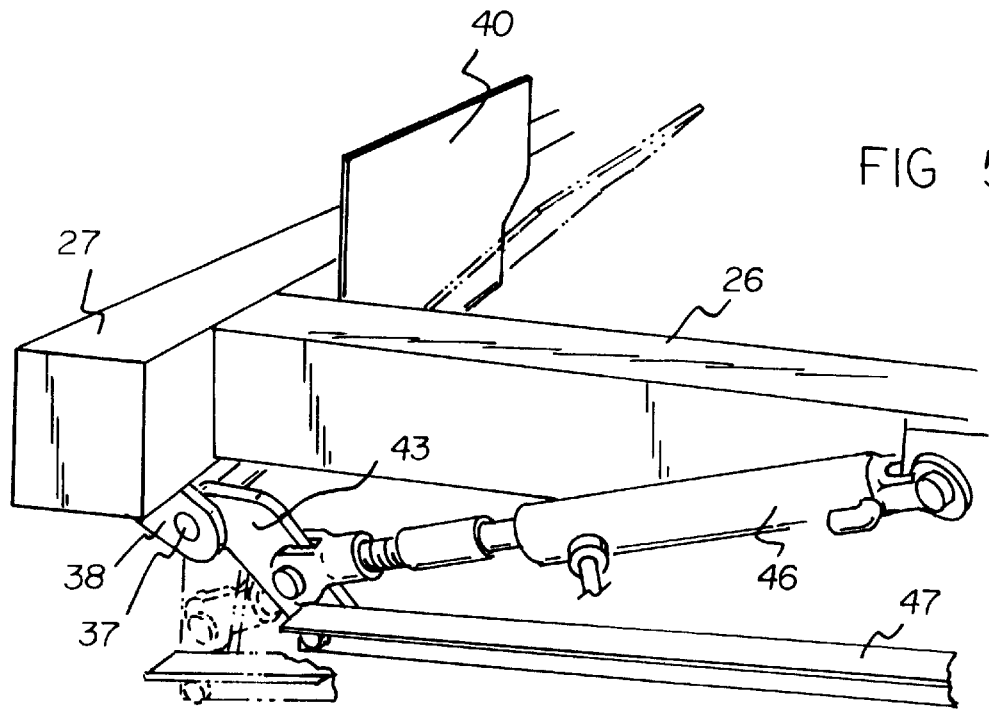
FIG. 5 is a detailed view of the elements contained within the circled line 5 of FIG. 4.

The U-shaped frame 13 includes a base end 17 which is fixed in any appropriate manner to the rear end of the front portion 12, and left and right arms 18,19 extending rearward from the base end. The base end 17 includes at least a beam 20 which extends between the ends of the arms 18,19 for rigidly spacing the ends of the arms. As best seen in FIG. 3, there is no connection between the arms 18,19, other than the connection provided by the base end 17, such that the space between the arms is unobstructed. The base end 17 and the arms 18,19 are preferably made of tubular members so as to reduce the weight of the frame, and made of metal to provide sufficient strength and rigidity.

Figure 6:
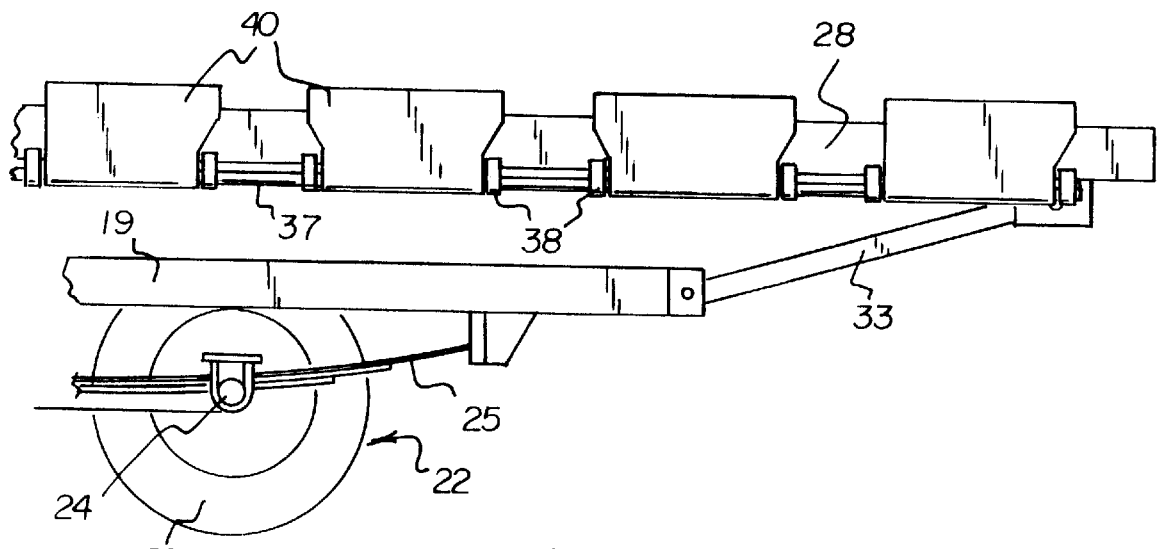
FIG. 6 is a view looking generally in the direction of line 6—6 of FIG. 3, with the lift apparatus in the lowered position.

A wheel assembly 21,22 is mounted on each of the arms 18,19, respectively, for rollingly supporting the frame 13, and the back end of the vehicle 10, upon the ground. The wheel assemblies 21,22 are identical to each other, so only the assembly 22 will be described in detail. Referring to FIG. 6, it is seen that the assembly 22 includes a wheel 23 which is rotationally mounted upon an axle 24 supported by the arm 19 in a manner which is known to those having ordinary skill in the art. A spring suspension system 25 is provided which resiliently supports the axle and wheel in a conventional manner. The assembly 22 is thus independently supported on the arm 19, separate from the assembly 21. The mounting of wheels and suspension systems therefore are well known in the art, and therefore no further details are provided. It is sufficient that each arm 18,19 has a separate wheel assembly appropriately mounted, with no connection between the assemblies, so that the unobstructed space between the arms is maintained.

The U-shaped lift apparatus 14 is similar in shape to the U-shaped frame 13, and includes a base beam 26 which is substantially parallel to the beam 20, and a pair of spaced arms 27,28 extending rearwardly from the beam 26 and which are substantially parallel to the arms 18,19 and vertically aligned therewith. The beam 26 and the arms 27,28 are also preferably made from tubular members to reduce weight, and made of a metal material to provide sufficient strength. Additionally, there is no connection between the arms 27,28, other than the beam 26, so as to maintain an unobstructed space between the arms. The spacing between the arms 27,28, and between the arms 18,19, is chosen based upon the size of the containers to be transported, such that the containers fit between the arms 18,19,27,28.

A pair of front linkage bars 29,30 are pivotally connected at each end to the base end 17 and to the ends of the arms 27,28 adjacent the beam 26. A spacing bar 31 preferably extends between the linkage bars 29,30 intermediate their ends so as to maintain the spacing of the bars. In addition, a pair of rear linkage bars 32,33 are pivotally connected at each end to the rear ends of the arms 18,19 and to the rear ends of the arms 27,28. By means of the bars 29,30,32,33, the U-shaped lift apparatus 14 is supported for vertical movements relative to the U-shaped frame 13, between a lowered position shown in FIG. 1 and a vertically raised position shown in FIG. 2. As is evident from FIGS. 1 and 2, the apparatus 14 pivots forward and backward relative to the frame 13 a small distance during its vertical movements, with the result that the rear linkage bars 32,33 and the rear ends of the arms 27,28 extend beyond the rear end of the arms 18,19. However, the arms 27,28 remain in vertical alignment with the arms 18,19 during the movements of the lift apparatus.

Figure 2:
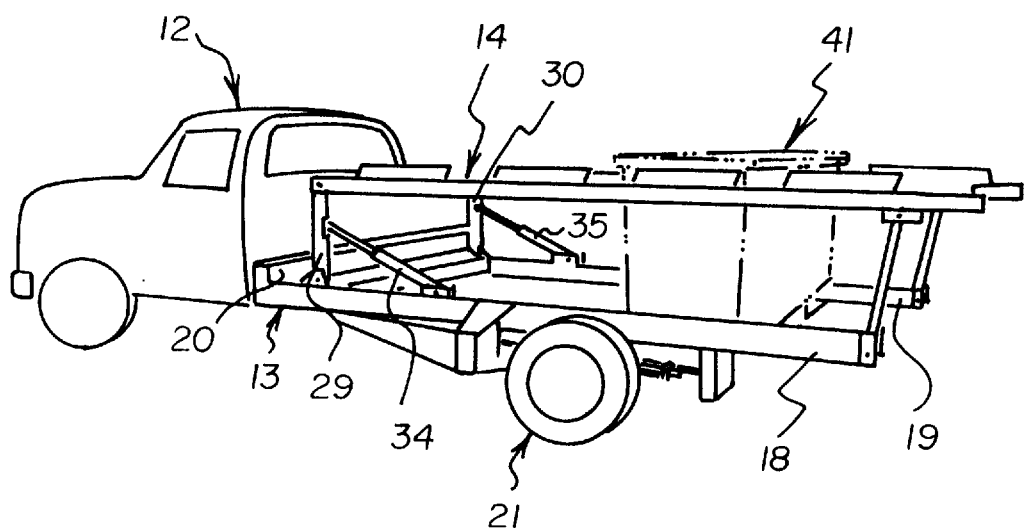
FIG. 2 is a rear, left-side perspective view of the vehicle with the lift apparatus raised.

For actuating the lift apparatus between its lowered and raised positions, a pair of actuators 34,35 extend between the arms 18,19 and the front linkage bars 29,30. The actuators are preferably of the hydraulic piston and cylinder type, although pneumatic actuators or screwjack actuators can be used as well. The actuators 34,35 are connected with a suitable control system for selectively controlling their actuation. Referring to FIGS. 1–2, it can be seen that in the lowered position of the lift apparatus, the actuators are retracted. In order to raise the lift apparatus, the actuators are extended, which pivots the bars 29,30 toward the front vehicle portion 12, causing the lift apparatus to be raised.

An actuating rod 36,37 is pivotally supported on each of the arms 27,28 by a plurality of spaced support ears 38 which are connected to the arms 27,28 along the lengths thereof. A plurality of lifting plates 39,40 are spaced along each rod 36,37 and fixedly connected thereto, such that they pivot with the rods between a first, vertical position (shown in full lines in FIG. 5) and a second, angled position (shown in dashed lines in FIG. 5). In the angled position, the plates 39,40 angle toward each other, generally towards the open space between the arms 27,28. The plates 39,40 are adapted to engage with sides of a container 41 (shown in dashed lines in FIGS. 1 and 2) permitting the container 41 to be lifted when the lift apparatus is raised. Containers with which this vehicle is used typically include flanges or like on the sides thereof. The plates 39,40 are adapted to fit under these flanges so that the container is lifted when the lift apparatus is raised.

Each actuating rod 36,37 includes an actuating lever 42,43 connected thereto. The lever 42 extends in a direction generally above the axis of the rod 36, while the lever 43 extends in a direction generally below the axis of the rod 37. A first actuator 44 is connected at one end thereof to a flange 45 extending from the beam 26, and connected at its opposite end to the lever 42. A second actuator 46 is rigidly connected at one end to the beam 26, and connected at its opposite end to the lever 43. The actuators 44,46 actuate the levers 42,43 so as to cause pivoting of the rods 36,37 and the plates connected thereto. The actuators are preferably of the hydraulic piston and cylinder variety, although other types of actuators can be used, and are suitably connected with the control system for the actuators 34,35, for permitting selective control of the actuators 44,46. The actuators and levers 42,43 are preferably configured such that the plates 39 are substantially vertical when the actuator 44 is fully extended, and the plates 40 are vertical when the actuator 46 is fully retracted. Thus, the actuator 44 must be retracted to pivot the plates 39 to their angled position, and the actuator 46 must be extended to pivot the plates 40 to their angled position. In order to assure that the plates 39,40 pivot in synchronization, a synchronization means in the form of a bar 47 is connected between the ends of the levers 42,43, so that the levers move in unison with each other. Additionally, the bar provides a fail safe mechanism in the event one of the actuators 44,46 fails or is not working properly, by transmitting the movements of the properly operating actuator and lever to the lever of the malfunctioning actuator.

In use, the operator of the vehicle backs the vehicle up to the container to be moved, with the lift apparatus in the lowered position and the plates 39,40 in their vertical orientation. Making sure that the container is lined up between the arms 18,19,27,28, the operator continues backing up until the container is located within the open U-space and the arms are on either side of the container. The actuators 44,46 are then actuated to cause the plates to pivot to their angled positions, toward the container, so as to be disposed underneath the flanges on the sides of the container. With the plates in this position, the actuators 34,35 are then actuated to push against the front linkage arms 29,30 and thus raise the lifting apparatus, which lifts the container from the ground due to the engagement between the plates and the flanges on the sides of the container. The container can then be transported by the vehicle to the desired location, and placed in this new location by lowering the lift apparatus and then pivoting the plates to the vertical position. The vehicle is then driven forwardly until the container is no longer between the arms, for use in moving another container.

The cab portion 15 of the vehicle 10 preferably includes controls therein for controlling the actuators 34,35,44,46, such controls being known to those having ordinary skill in the art.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A container lifting and transport vehicle, said container having a body portion and an upper rim portion protruding laterally from the body portion of said container, said container lifting and transport vehicle comprising:

a front vehicle portion supported by a pair of front wheels and having a motor mounted thereon for powering the vehicle;

a substantially U-shaped frame extending from a rear of the front portion, said U-shaped frame having a first base end and a first pair of spaced arms extending from the first base end;

a rear wheel assembly connected to each of said arms in said first pair, said rear wheel assemblies supporting the U-shaped frame upon the ground; and a substantially U-shaped lift apparatus mounted to the U-shaped frame for vertical movement relative thereto, said U-shaped lift apparatus being movable between a first, lowered position and a second, vertically raised position;

wherein said U-shaped lift apparatus includes a second pair of spaced arms extending substantially parallel to, and substantially vertically aligned with, the first pair of spaced arms;

at least one lifting plate pivotally mounted on each of the arms of said second pair of arms of said U-shaped lift apparatus, each of said lifting plates being adapted to pivot about an axis substantially parallel to the arm on which it is mounted, said lifting plates each having a lifting edge for engaging the body portion of the container below the upper rim portion of said container;

wherein each of said lifting plates pivots between a first position where the lifting edges of said plates on said spaced arms are spaced from each other at a first distance and a second position wherein said plates are angled toward each other with said lifting edges spaced from each other at a second distance, wherein said second distance is less than said first distance.

2. The container lifting and transport vehicle according to claim 1, wherein said U-shaped lift apparatus includes a second base end which is substantially parallel to the first base end.

3. The container lifting and transport vehicle according to claim 2, further including front linkage bars extending between, and pivotally connected to, the first base end and the second pair of spaced arms, and rear linkage bars extending between, and pivotally connected to, the first pair of arms and the second pair of arms.

4. The container lifting and transport vehicle according to claim 3, further comprising actuation means connected to the front linkage bars for actuating the U-shaped lift apparatus between the first position and the second position.

5. The container lifting and transport vehicle according to claim 4, wherein said actuation means comprises a hydraulic actuator extending between each of the front linkage bars and the first pair of arms.

6. The container lifting and transport vehicle according to claim 2, further comprising a plurality of spaced lifting plates pivotally attached to each of the arms of said second pair of arms.

7. The container lifting and transport vehicle according to claim 6, further including actuation means connected to the lifting plates for causing pivoting movements thereof.

8. The container lifting and transport vehicle according to claim 7, wherein said actuation means comprises a first hydraulic actuator connected to the lifting plates on one of said arms of the second pair of arms, and a second hydraulic actuator connected to the lifting plates on the other said arm of the second pair of arms.

9. The container lifting and transport vehicle according to claim 8, wherein said actuation means further comprises a rod pivotally mounted on each of said arms of said second pair of arms, said lifting plates being rigidly attached to said rods, and an actuating lever connected to each rod, said first hydraulic actuator connected to one of the actuating levers for causing pivoting of the rod and plates attached thereto, and said second hydraulic actuator connected to the other one of the actuating levers for causing pivoting of the rod and plates attached thereto.

10. The container lifting and transport vehicle according to claim 9, wherein said first hydraulic actuator and said second hydraulic actuator are connected to the second base end.

11. The container lifting and transport vehicle according to claim 9, further including synchronization means connected to the actuating levers for causing synchronous pivoting movements of the lifting plates on each arm of the second pair of arms.

12. The container lifting and transport vehicle according to claim 1, wherein each said rear wheel assembly is independently supported by the arm to which it is connected.

13. A container lifting and transport vehicle, comprising:

a front vehicle portion supported by a pair of front wheels and having a motor mounted thereon for powering the vehicle;

a U-shaped frame extending from a rear of the front portion, said U-shaped frame having a first base end and a first pair of spaced arms extending from the first base end;

a rear wheel assembly connected to each of said arms in said first pair, said rear wheel assemblies supporting the U-shaped frame upon the ground;

a U-shaped lift apparatus mounted to the U-shaped frame for vertical movement relative thereto, said U-shaped lift apparatus being movable between a first, lowered position and a second, vertically raised position said U-shaped lift apparatus including a second base end which is substantially parallel to the first base ends and a second pair of spaced arms extending from the second base end and which are parallel to, and substantially vertically aligned with, the first pair of spaced arms; and a plurality of spaced lifting plates pivotally attached to each of the arms of said second pair of arms;

wherein said lifting plates on each of the arms pivot between a first position where the plates are oriented substantially vertical and a second position where the plates are angled toward each other.

14. The container lifting and transport vehicle according to claim 13, further including actuation means connected to the lifting plates for causing pivoting movements thereof.

15. The container lifting and transport vehicle according to claim 14, wherein said actuation means comprises a first hydraulic actuator connected to the lifting plates on one of said arms of the second pair of arms, and a second hydraulic actuator connected to the lifting plates on the other said arm of the second pair of arms.

16. The container lifting and transport vehicle according to claim 15, wherein said actuation means further comprises a rod pivotally mounted on each of said arms of said second pair of arms, said lifting plates being rigidly attached to said rods, and an actuating lever connected to each rod, said first hydraulic actuator connected to one of the actuating levers for causing pivoting of the rod and plates attached thereto, and said second hydraulic actuator connected to the other one of the actuating levers for causing pivoting of the rod and plates attached thereto.

17. The container lifting and transport vehicle according to claim 16, wherein said first hydraulic actuator and said second hydraulic actuator are connected to the second base end.

18. The container lifting and transport vehicle according to claim 16, further including synchronization means connected to the actuating levers for causing synchronous pivoting movements of the lifting plates on each arm of the second pair of arms.

19. The container lifting and transport vehicle according to claim 13, wherein each said rear wheel assembly is independently supported by the arm to which it is connected.

20. A container lifting and transport vehicle, comprising:

a front vehicle portion supported by a pair of front wheels and having a motor mounted thereon for powering the vehicle;

a U-shaped frame extending from a rear of the front portion, said U-shaped frame having a first base end and a first pair of spaced arms extending from the first base end;

a rear wheel assembly connected to each of said arms in said first pair, said rear wheel assemblies supporting the U-shaped frame upon the ground;

a U-shaped lift apparatus mounted to the U-shaped frame for vertical movement relative thereto, said U-shaped lift apparatus being movable between a first, lowered position and a second, vertically raised position, said U-shaped lift apparatus including a second base end which is substantially parallel to the first base end, and a second pair of spaced arms extending from the second base end and which are parallel to, and substantially vertically aligned with, the first pair of spaced arms;

a plurality of spaced lifting plates pivotally attached to each of the arms of said second pair of arms; and actuation means connected to the lifting plates for causing pivoting movements thereof;

wherein said lifting plates on each of the arms pivot between a first position where the plates are oriented substantially vertical and a second position where the plates are angled toward each other;

wherein said actuation means comprises a first hydraulic actuator connected to the lifting plates on one of said arms of the second pair of arms, and a second hydraulic actuator connected to the lifting plates on the other said arm of the second pair of arms, said actuation means comprising a rod pivotally mounted on each of said arms of said second pair of arms, said lifting plates being rigidly attached to said rods, and an actuating lever connected to each rod, said first hydraulic actuator connected to one of the actuating levers for causing pivoting of the rod and plates attached thereto, and said second hydraulic actuator connected to the other one of the actuating levers for causing pivoting of the rod and plates attached thereto, wherein a synchronization means is connected to the actuating levers for causing synchronous pivoting movements of the lifting plates on each arm of the second pair of arms;

wherein said first hydraulic actuator and said second hydraulic actuator are connected to the second base end; and wherein each said rear wheel assembly is independently supported by the arm to which it is connected.

* * * * *